(12) United States Patent
Alber

(10) Patent No.: US 9,758,247 B2
(45) Date of Patent: Sep. 12, 2017

(54) COMBINED LAUNCH AND MISSION VEHICLES

(71) Applicant: Sikorsky Aircraft Corporation, Stratford, CT (US)

(72) Inventor: Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 267 days.

(21) Appl. No.: 14/685,054

(22) Filed: Apr. 13, 2015

(65) Prior Publication Data

US 2015/0353197 A1 Dec. 10, 2015

Related U.S. Application Data

(60) Provisional application No. 62/010,231, filed on Jun. 10, 2014.

(51) Int. Cl.
*B64C 37/02* (2006.01)
*B64D 5/00* (2006.01)
*B64C 29/02* (2006.01)

(52) U.S. Cl.
CPC .............. *B64D 5/00* (2013.01); *B64C 29/02* (2013.01); *B64C 2201/082* (2013.01)

(58) Field of Classification Search
CPC ... B64C 37/02; B64C 29/02; B64C 2201/082; B64D 5/00
See application file for complete search history.

(56) References Cited

U.S. PATENT DOCUMENTS

| | | | | |
|---|---|---|---|---|
| 2,653,777 A * | 9/1953 | Barkey | ............. | B64D 5/00 244/2 |
| 2,843,337 A * | 7/1958 | Bennett | ............. | B64D 5/00 244/2 |
| 2,863,618 A * | 12/1958 | Doyle | ............. | B64D 5/00 244/2 |
| 2,921,756 A * | 1/1960 | Borden | ............. | B64D 5/00 244/2 |
| 2,936,966 A * | 5/1960 | Vogt | ............. | B64C 37/02 244/2 |
| 3,369,771 A * | 2/1968 | Walley | ............. | B64D 5/00 244/159.3 |
| 4,267,987 A * | 5/1981 | McDonnell | ............. | B64D 39/00 244/137.4 |
| 4,678,141 A * | 7/1987 | Sarrantonio | ............. | B64C 37/02 244/2 |
| 4,824,047 A * | 4/1989 | Chadwick | ............. | B64D 5/00 244/16 |
| 5,000,398 A * | 3/1991 | Rashev | ............. | B64D 5/00 244/110 E |
| 5,465,923 A | 11/1995 | Milner | | |
| 5,507,451 A * | 4/1996 | Karnish | ............. | A63H 27/005 102/348 |

(Continued)

*Primary Examiner* — Brian M O'Hara
*Assistant Examiner* — Assres H Woldemaryam
(74) *Attorney, Agent, or Firm* — Cantor Colburn LLP

(57) ABSTRACT

An aircraft is provided and includes a mission vehicle configured to follow vertical take-off and landing (VTOL) operations and to execute forward flight, hover/loiter and landing operations and a launch vehicle configured to drive the mission vehicle through at least vertical take-off (VTO) operations. The launch vehicle is umbilically coupled to the mission vehicle during the VTO operations and releasable from the mission vehicle thereafter.

14 Claims, 3 Drawing Sheets

(56) References Cited

U.S. PATENT DOCUMENTS

| | | | |
|---|---|---|---|
| 5,615,847 A | 4/1997 | Bourlett | |
| 5,765,783 A * | 6/1998 | Albion | B64C 29/02 244/17.23 |
| 6,612,522 B1 * | 9/2003 | Aldrin | B64G 1/002 244/159.3 |
| 6,666,409 B2 * | 12/2003 | Carpenter | B64G 1/14 244/159.3 |
| 7,080,809 B2 * | 7/2006 | Hall | B64G 1/14 244/172.2 |
| 7,147,182 B1 * | 12/2006 | Flanigan | B64C 29/0033 244/6 |
| 7,275,711 B1 * | 10/2007 | Flanigan | B64C 27/18 244/17.11 |
| 7,357,352 B2 * | 4/2008 | Speer | B64C 39/024 244/2 |
| D614,559 S | 4/2010 | Alber | |
| 7,930,074 B2 | 4/2011 | Cherepinsky | |
| 8,434,710 B2 * | 5/2013 | Hothi | B64C 39/024 244/17.23 |
| 8,950,698 B1 * | 2/2015 | Rossi | B64C 37/02 244/2 |
| 2002/0139901 A1 * | 10/2002 | Penn | B64G 1/002 244/171.1 |
| 2010/0012769 A1 | 1/2010 | Alber | |
| 2011/0017872 A1 * | 1/2011 | Bezos | B64G 1/002 244/158.9 |
| 2013/0200207 A1 | 8/2013 | Pongratz | |
| 2014/0008486 A1 | 1/2014 | Alber | |
| 2014/0217230 A1 * | 8/2014 | Helou, Jr. | B64C 25/14 244/17.17 |
| 2015/0102157 A1 * | 4/2015 | Godlasky | B64D 27/02 244/13 |

* cited by examiner

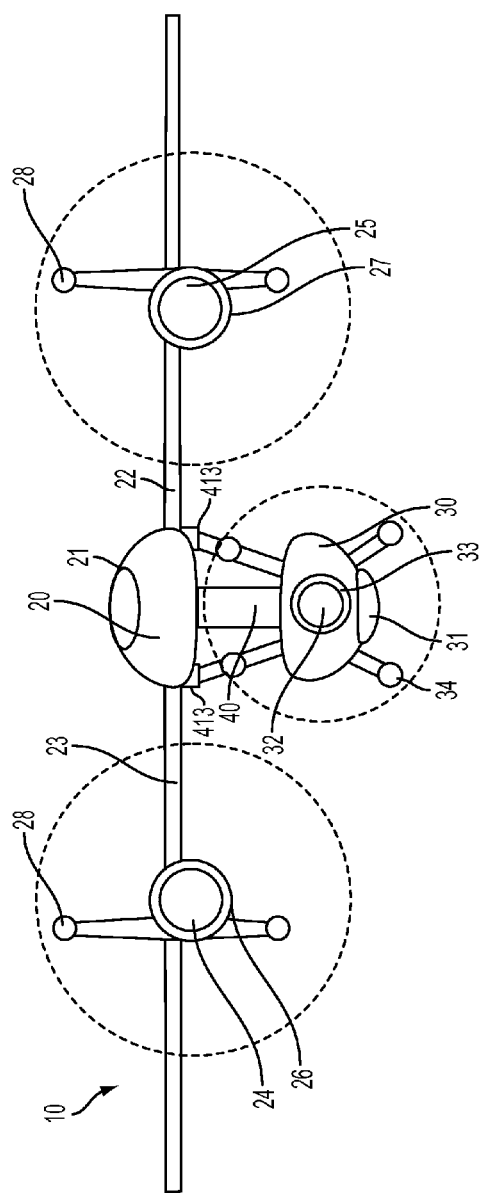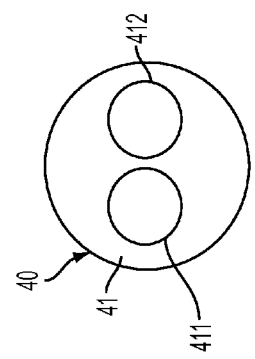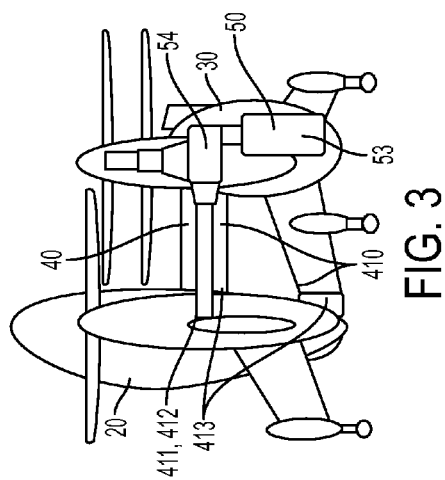

COMBINED LAUNCH AND MISSION VEHICLES

CROSS REFERENCE TO RELATED APPLICATION

This application is a Non-Provisional of U.S. Application No. 62/010,231 filed Jun. 10, 2014, the disclosures of which are incorporated by reference herein in its entireties.

BACKGROUND OF THE INVENTION

The subject matter disclosed herein relates to combined launch and mission vehicles and, more particularly, to a launch vehicle for use with a vertical take-off and landing (VTOL) aircraft.

A vertical take-off and landing aircraft (VTOL) is an aircraft that can take off, land and hover in a vertical direction and that can conduct flight operations in a horizontal orientation. VTOL aircraft may be manned (i.e., piloted) or unmanned in the case of remotely piloted or autonomous aircraft and may be housed or stowed in places with limited deck and storage areas, such as naval ships.

Often, VTOL aircraft have a fixed wing configuration with the landing gear permanently affixed to the fixed tail surfaces. In these cases, the VTOL aircraft sits in its grounded condition on the landing gear so that its nose cone faces upwardly. During take-off operations, an engine(s) of the VTOL aircraft drives its rotors at high speeds to cause the VTOL aircraft to lift off from the ground. As the take-off operations transition into flight operations, the VTOL aircraft is maneuvered from a vertical orientation into a mission appropriate horizontal orientation.

Execution of the take-off operations is highly costly in terms of the amounts of fuel required to take-off from a hover. This amount of fuel would normally have to be carried by the VTOL aircraft, which has a limited fuel capacity. Thus, the expense of fuel during the take-off operations necessarily leaves a decreased amount of fuel left over for mission operations especially including cruise and loiter which consequently limits the scope of such mission operations.

BRIEF DESCRIPTION OF THE INVENTION

According to one aspect of the invention, an aircraft is provided and includes a mission vehicle configured to follow vertical take-off and landing (VTOL) operations and to execute forward flight, hover/loiter and landing operations and a launch vehicle configured to drive the mission vehicle through at least vertical take-off (VTO) operations. The launch vehicle is umbilically coupled to the mission vehicle during the VTO operations and releasable from the mission vehicle thereafter.

In accordance with additional or alternative embodiments, the mission and launch vehicles are configured such that the launch vehicle at least partially drives rotations of mission vehicle rotors during at least the VTO operations.

In accordance with additional or alternative embodiments, the aircraft is configured to perform unmanned operations.

In accordance with additional or alternative embodiments, the launch vehicle is sized for the driving of the mission vehicle.

In accordance with additional or alternative embodiments, the launch vehicle is configured to execute return flight operations following release.

In accordance with additional or alternative embodiments, the mission vehicle includes a fuselage, wings extending outwardly from opposite sides of the fuselage, the wings respectively including first and second engine nacelles, first and second rotors drivable by the first and second engine nacelles, respectively, to thereby drive the mission vehicle during at least the forward flight, hover/loiter and landing operations and alighting elements coupled to each of the wings proximate to the engine nacelles and configured to support the mission vehicle during grounded operations.

In accordance with additional or alternative embodiments, the launch vehicle includes a fuselage including an engine nacelle, a rotor drivable by the engine nacelle to thereby drive the mission and launch vehicles during at least the VTO operations and alighting elements coupled to the fuselage proximate to the engine nacelle and configured to support the launch vehicle during ground operations.

In accordance with additional or alternative embodiments, the aircraft further includes an umbilical by which the mission and launch vehicles are connectable and the umbilical includes structural elements, a power coupling, a data coupling and release mechanisms.

In accordance with additional or alternative embodiments, the aircraft further includes a flight computer housed in one or both of the mission and launch vehicles. The flight computer is configured to control the driving of the mission vehicle by the launch vehicle and to control launch vehicle release.

According to another aspect of the invention, a launch vehicle for use with a mission vehicle of a vertical take-off and landing (VTOL) aircraft is provided. The launch vehicle includes a fuselage including an engine nacelle, a rotor drivable by the engine nacelle to thereby drive the mission and launch vehicles during at least vertical take-off (VTO) operations and alighting elements coupled to the fuselage proximate to the engine nacelle and configured to support the launch vehicle during ground operations. The fuselage is umbilically coupled to the mission vehicle during the VTO operations and releasable from the mission vehicle thereafter.

In accordance with additional or alternative embodiments, the mission and launch vehicles are configured such that the engine nacelle of the launch vehicle at least partially drives rotations of mission vehicle rotors during at least the VTO operations.

In accordance with additional or alternative embodiments, the aircraft is configured to perform unmanned operations.

In accordance with additional or alternative embodiments, the launch vehicle is sized for the driving of the mission vehicle.

In accordance with additional or alternative embodiments, the launch vehicle is configured to execute return flight operations following release.

In accordance with additional or alternative embodiments, the launch vehicle further includes an umbilical by which the mission and launch vehicles are connectable and the umbilical includes structural elements, a power coupling, a data coupling and release mechanisms.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is a front view of the launch vehicle and the VTOL aircraft of FIG. 1;

FIG. 3 is a cutaway side view of the launch vehicle and the VTOL aircraft of FIG. 1;

FIG. 4 is a schematic side view of an umbilical of a launch vehicle and a VTOL aircraft in accordance with embodiments

The detailed description explains embodiments of the invention, together with advantages and features, by way of example with reference to the drawings.

DETAILED DESCRIPTION OF THE INVENTION

An endurance aircraft, such as a vertical take-off and landing (VTOL) aircraft, requires a significant amount of engine power to execute vertical take-off (VTO) and hover operations. For cruise and especially loiter operations, this power requirement can be reduced but because of the low power settings, fuel consumption can still be high versus a right-sized engine for forward flight. In some cases, one engine can be shutdown thereby improving efficiency but the aircraft would still be carrying the weight of the shutdown engine.

As will be described below, a system that uses a mission vehicle and a launch vehicle is provided. The mission vehicle is sized for cruise portions of the flight (hereinafter referred to "as forward flight operations") and for the lighter, end of the mission hover/loiter and landing operations. The launch vehicle is sized to provide the excess power to hover at take-off and is releasable from the mission vehicle thereafter. The launch vehicle can be further sized to return to base following release.

Figure 1:
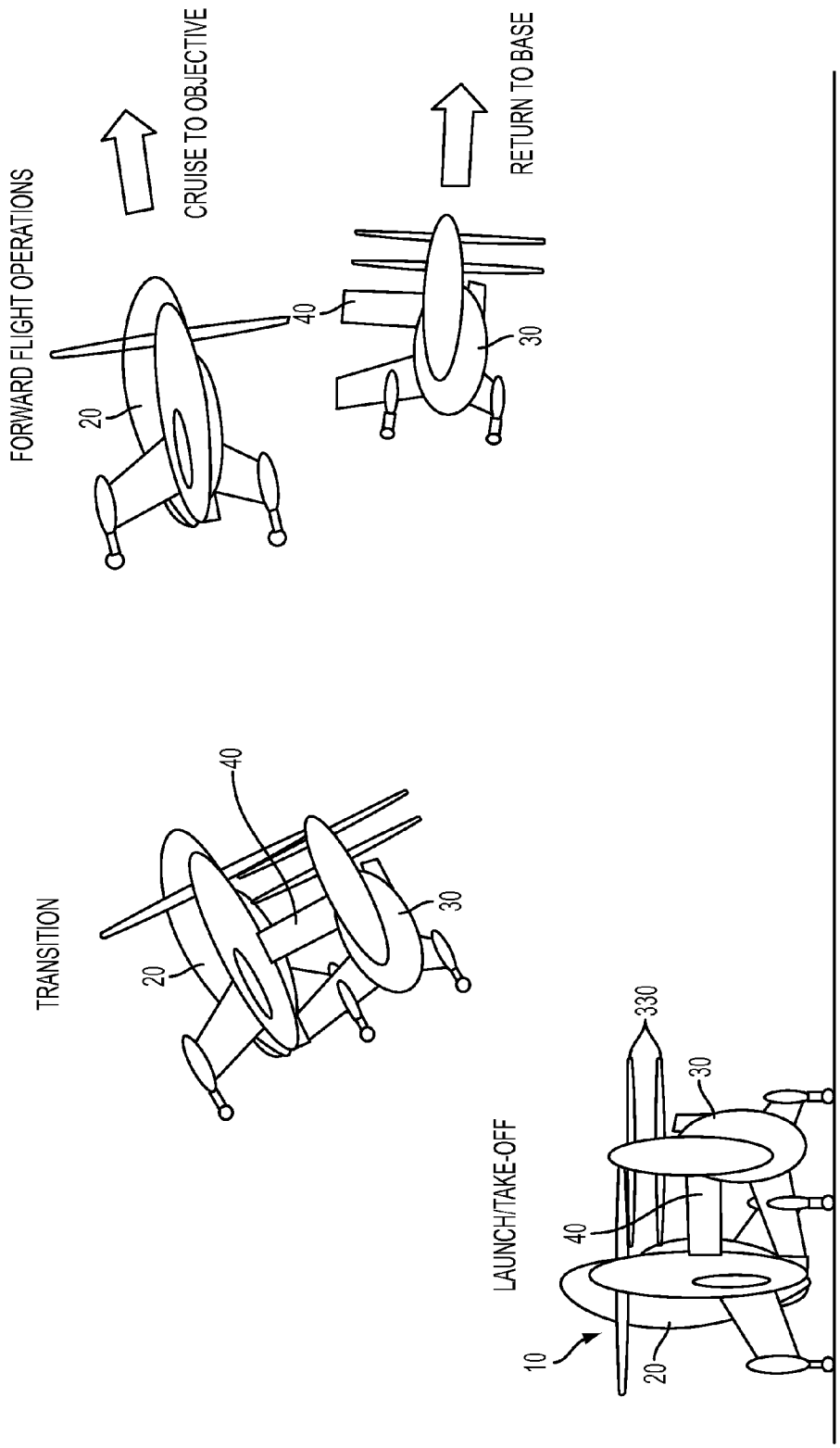
FIG. 1 is a schematic illustration of an operation of a launch vehicle and a vertical take-off and landing (VTOL) aircraft in accordance with embodiments.

With reference to FIGS. 1 and 2, an aircraft 10 is provided. The aircraft 10 may be configured as a VTOL aircraft and may be capable of performing manned, unmanned or remotely controlled operations. The aircraft 10 includes a mission vehicle 20, a launch vehicle 30 and an umbilical 40 by which the launch vehicle 30 is connectable to the mission vehicle 20. The mission vehicle 20 is configured to follow VTOL operations and to execute forward flight, hover/loiter and landing operations. The launch vehicle 30 is configured to drive the mission vehicle 20 through at least launch and VTO operations. As shown in FIG. 1, the launch vehicle 30 is umbilically coupled to the mission vehicle 20 initially when the aircraft 10 is grounded and during the launch and VTO operations by the umbilical 40. Then, as the launch and VTO operations end or otherwise transition to forward flight operations, the launch vehicle 30 is releasable from the mission vehicle 20 whereupon the launch vehicle 30 may return to base. More particularly, as the launch and VTO operations end or otherwise transition to forward flight operations, the umbilical 40 disconnects from the mission vehicle 20 whereupon the launch vehicle 30 and the umbilical 40 may return to base as a unit.

In accordance with embodiments, the launch vehicle 30 may be sized to have the capacity, in terms of ready fuel supplies and available power, to drive the mission vehicle 20 during the launch and VTO operations and at least partially during the transition from the launch and VTO operations to the forward flight operations. With the launch vehicle 30 sized in this manner, the mission vehicle 20 may be sized only to perform its mission. That is, the mission vehicle 20 may be sized only to execute the forward flight, hover/loiter and landing operations, which can all be extended in scope due to the presence of the launch vehicle 30 during the launch and VTO operations.

In accordance with further embodiments, the launch vehicle 30 may be sized to have additional capacity to execute a return-to-base operation following release of the launch vehicle 30 (and the umbilical 40) from the mission vehicle 20.

In accordance with further embodiments, it will be understood that the mission vehicle 20 can also be configured to execute the launch and VTO operations. In such cases, one of the mission vehicle 20 or the launch vehicle 30 may be provided as a redundant system for executing launch and VTO operations. Alternatively, in such cases, one of the mission vehicle 20 or the launch vehicle 30 may be provided as an assisting system for the other during the execution of the launch and VTO operations.

The mission vehicle 20 may include a fuselage 21 extending along a longitudinal axis that has a nose cone section at a first longitudinal end of the fuselage 21, a tail section opposite from the nose cone section at a second longitudinal end of the fuselage 21 and first and second opposite sides extending along the fuselage 21. The fuselage 21 is generally formed to have reduced or otherwise limited aerodynamic drag and defines an interior in which multiple components are housed for flight operations. As illustrated, the fuselage 21 is configured to support unmanned flight operations but it is to be understood that this is not required.

The mission vehicle 20 further includes a first wing 22 extending radially outwardly from the first side of the fuselage 21, a second wing 23 extending radially outwardly from the second side of the fuselage 21, first and second engine nacelles 24 and 25 and first and second rotors 26 and 27. The first and second wings 22 and 23 extend in substantially opposite directions and may be substantially parallel with each other. The first and second engine nacelles 24 and 25 are disposed along the first and second wings 22 and 23, respectively, and each includes a drive section. The first and second rotors 26 and 27 are drivable by the drive sections of the first and second engine nacelles 24 and 25, respectively, to thereby drive the mission vehicle 20 during at least the forward flight, hover/loiter and landing operations. Each of the first and second rotors 26 and 27 includes a hub defining a rotational axis and a plurality of propeller blades extending radially outwardly from the hub.

The mission vehicle 20 further includes alighting elements 28. The alighting elements 28 are coupled to each of the first and second wings 22 and 23 at locations proximate to the first and second engine nacelles 24 and 25. The alighting elements 28 may extend away from a plane defined by the first and second wings 22 and 23 and are configured to support the mission vehicle 20 in a vertical orientation during grounded operations.

Although the mission vehicle 20 is not illustrated as being configured for relative pivoting between the first and second wings 22 and 23 and the fuselage 21 or as exhibiting a variable geometry in the form of pivotable wings, for example, it is to be understood that such pivoting and variable geometry exhibition is possible. That is, the mission vehicle 20 is capable of similar re-configurations as those disclosed in U.S. application Ser. No. 14/243,540, which was filed on Apr. 2, 2014, the entire disclosures of which are incorporated herein by reference.

The launch vehicle 30 may include a fuselage 31 extending along a longitudinal axis that has a nose cone section at a first longitudinal end of the fuselage 31, a tail section opposite from the nose cone section at a second longitudinal end of the fuselage 31 and first and second opposite sides extending along the fuselage 31. The fuselage 31 is generally formed to have reduced or otherwise limited aerodynamic drag and defines an interior in which multiple components are housed for flight operations. As illustrated, the fuselage 31 is configured to support unmanned flight operations but it is to be understood that this is not required.

The launch vehicle 30 further includes an engine nacelle 32 and a rotor 33. The engine nacelle 32 is disposed along the fuselage 31 and includes a drive section. The rotor 33 is drivable by the drive section of the engine nacelle 32 to thereby drive the mission vehicle 20 and the launch vehicle 30 during at least the launch and VTO operations. The rotor 33 includes a hub defining a rotational axis and a plurality of propeller blades extending radially outwardly from the hub. As shown in FIG. 1, the rotor 33 may be provided as coaxial, counter-rotating rotors 330. When the launch vehicle 30 is connected with the mission vehicle 20, the coaxial, counter-rotating rotors 330 may be disposed at a plane that is recessed or otherwise displaced from a plane defined by the first and second rotors 26 and 27 of the mission vehicle 20.

As shown in FIG. 2, with the launch vehicle 30 connected to the mission vehicle 20, the first and second rotors 26 and 27 of the mission vehicle 20 and the rotor 33 of the launch vehicle 30 may be provided in a triangular configuration with the respective blade disks of each of the first and second rotors 26 and 27 being separated from one another by a first gap and the blade disk of the rotor 33 being separated by the respective blade disks of each of the first and second rotors 26 and 27 by second gaps of similar distances that are shorter than the first gap.

The launch vehicle 30 further includes alighting elements 34. The alighting elements 34 are coupled to the fuselage 31 at locations proximate to the engine nacelle 32. The alighting elements 34 may extend away from a plane defined by the fuselage 31 and are configured to support the launch vehicle 30 in a vertical orientation during grounded operations.

With reference to FIGS. 2-4, the mission and launch vehicles 20 and 30 are connectable by way of the umbilical 40. The umbilical 40 may be provided as a strut element 41 that includes multiple structural elements 410, a power coupling 411, a data coupling 412 and release mechanisms 413. In accordance with embodiments, the multiple structural elements 410 may be provided as a plurality of substantially rigid, elongate elements that, in some cases, may be tubular with hollow interiors through which the power coupling 411 and the data coupling 412 extend between the mission vehicle 20 and the launch vehicle 30 (see FIG. 4). As shown in FIG. 2, the release mechanisms 413 may be provided at the connection between the umbilical 40 and the mission vehicle 20 and are configured to maintain the connection between the umbilical 40 and the mission vehicle 20 during at least the launch and VTO operations and to disconnect the umbilical 40 from the mission vehicle 20 thereafter. The release mechanisms 413 may be provided, for example, as mechanical or electro-mechanical hooks connected to the umbilical 40 and to grip elements provided on the mission vehicle 20 that the hooks can grab onto.

Figure 6:
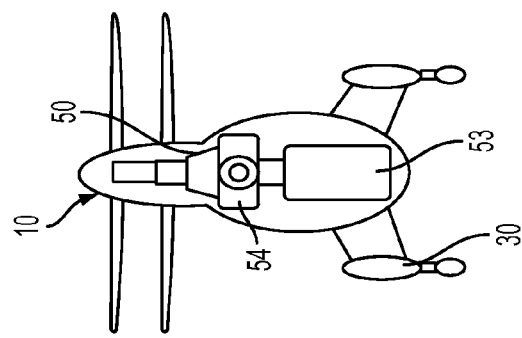
FIG. 6 is a cutaway elevational view of the launch vehicle of FIG. 1.
Figure 5:
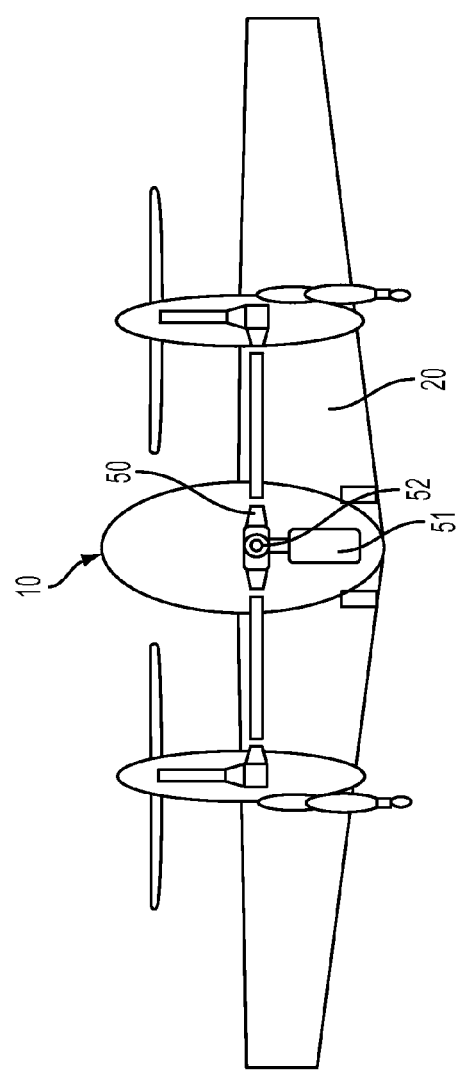
FIG. 5 is a cutaway elevational view of a portion of the VTOL aircraft of FIG. 1.

With continued reference to FIGS. 3, 5 and 6, the aircraft 10 may further include a flight computer 50. The flight computer 50 may be housed in one or both of the mission vehicle 20 and the launch vehicle 30. In the latter case, the flight computer 50 may include a first computing device 51 configured to control various operations of the mission vehicle 20 and a first transceiver 52, which are each housed in the fuselage 21 of the mission vehicle 20, and a second computing device 53 configured to control various operations of the launch vehicle 30 and a second transceiver 54, which are housed in the fuselage 31 of the launch vehicle 30. In such cases, the first and second transceivers 52 and 54 would be connectable with at least the power coupling 411, the data coupling 412 and the release mechanisms 413 such that the first and second computing devices 51 and 53 can communicate and such that the release mechanisms 413 can be operated. In accordance with embodiments, the data coupling 412 may be coupled to the release mechanisms 413 such that servo commands issued by the flight computer 50 to the release mechanisms 413 can be delivered thereto. In any case, the flight computer 50 is configured to control the driving of the mission vehicle 20 by the launch vehicle 30 and to control the release of the launch vehicle 30 (ant the umbilical 40) from the mission vehicle 20.

In accordance with further embodiments, the first and second rotors 26 and 27 are drivable by the drive sections of the first and second engine nacelles 24 and 25, respectively, and by the drive section of the engine nacelle 32 of the launch vehicle 30 to thereby drive the mission vehicle 20. In the case where the drive section of the engine nacelle 32 drives the first and second rotors 26 and 27, it will be understood that such driving occurs at least while the mission and launch vehicles 20 and 30 are connected by way of the umbilical 40 for at least the launch and VTO operations. To this end, the drive section of the engine nacelle 32 may be provided with additional power and torque necessary to drive rotations of the rotor 33 as well as the first and second rotors 26 and 27.

For the embodiments in which the drive section of the engine nacelle 32 of the launch vehicle 30 drives the rotations of the first and second rotors 26 and 27, it will be further understood that such driving may be in place of or in addition to driving of the first and second rotors 26 and 27 by the drive sections of the first and second engine nacelles 24 and 25, respectively, during the launch and VTO operations. In the latter case, the drive sections of the first and second engine nacelles 24 and 25 may be shut off completely so as to provide for substantial savings of, e.g., fuel for the mission vehicle 20. In the former case, the drive sections of the first and second engine nacelles 24 and 25 may be operated at full loads to advance through the launch and VTO operations with substantially increased speed due to the assistance provided by the launch vehicle 30 or at partial loads to provide for a combination of of savings of, e.g., fuel for the mission vehicle 20 and to advance through the launch and VTO operations with some increases in speed.

In any case, the mission vehicle 20 may further include gearing and clutch systems that allow for the driving of the first and second rotors 26 and 27 by just the drive sections of the first and second engine nacelles 24 and 25, respectively, just the drive section of the engine nacelle 32 of by a combination of the drive sections of the first and second engine nacelles 24 and 25 and the engine nacelle 32.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An aircraft, comprising:
    a mission vehicle configured to follow vertical take-off and landing (VTOL) operations and to execute forward flight, hover/loiter and landing operations; and
    a launch vehicle configured to drive the mission vehicle through at least vertical take-off (VTO) operations, the launch vehicle including:
    a fuselage including an engine nacelle along the fuselage, and
    alighting elements coupled to the fuselage proximate to the engine nacelle and configured to support the launch vehicle in a vertical orientation during ground operations,
    the launch vehicle and the mission vehicle are umbilically coupled, in the vertical orientation prior to VTO operation and during the VTO operations; and the launch vehicle is releasable from the mission vehicle thereafter,
    wherein the launch vehicle at least partially drives rotations of rotors of the mission vehicle during at least the VTO operations.

2. The aircraft according to claim 1, wherein the aircraft is configured to perform unmanned operations.

3. The aircraft according to claim 1, wherein the launch vehicle is sized for the driving of the mission vehicle.

4. The aircraft according to claim 1, wherein the launch vehicle is configured to execute return flight operations following release.

5. The aircraft according to claim 1, wherein the mission vehicle comprises:
    a fuselage;
    wings extending outwardly from opposite sides of the fuselage, the wings respectively including first and second engine nacelles;
    first and second rotors drivable by drive sections of the first and second engine nacelles, respectively, to thereby drive the mission vehicle during at least the forward flight, hover/loiter and landing operations; and
    alighting elements coupled to each of the wings proximate to the engine nacelles and configured to support the mission vehicle during grounded operations.

6. The aircraft according to claim 1, wherein the launch vehicle further comprises:
    a rotor drivable by a drive section of the engine nacelle to thereby drive the mission and launch vehicles during at least the VTO operations.

7. The aircraft according to claim 1, further comprising an umbilical by which the mission and launch vehicles are connectable, the umbilical comprising structural elements, a power coupling, a data coupling and release mechanisms.

8. The aircraft according to claim 1, further comprising a flight computer housed in one or both of the mission and launch vehicles,
    the flight computer being configured to control the driving of the mission vehicle by the launch vehicle and to control launch vehicle release.

9. A launch vehicle for use with a mission vehicle of a vertical take-off and landing (VTOL) aircraft, the launch vehicle comprising:
    a fuselage including an engine nacelle;
    a rotor drivable by the engine nacelle to thereby drive the mission and launch vehicles during at least vertical take-off (VTO) operations; and
    alighting elements coupled to the fuselage proximate to the engine nacelle and configured to support the launch vehicle in a vertical orientation during ground operations,
    the fuselage and the mission vehicle are umbilically coupled in the vertical orientation prior to VTO operation and during the VTO operations; and the fuselage is releasable from the mission vehicle thereafter,
    wherein a drive section of the engine nacelle of the launch vehicle at least partially drives rotations of mission vehicle rotors during at least the VTO operations.

10. The launch vehicle according to claim 9, wherein the mission vehicle is configured to perform unmanned operations.

11. The launch vehicle according to claim 9, wherein the launch vehicle is sized for the driving of the mission vehicle.

12. The launch vehicle according to claim 9, wherein the launch vehicle is configured to execute return flight operations following release.

13. The launch vehicle according to claim 9, further comprising an umbilical by which the mission and launch vehicles are connectable, the umbilical comprising structural elements, a power coupling, a data coupling and release mechanisms.

14. The aircraft of claim 1, wherein a longitudinal axis of the launch vehicle is in the vertical orientation during VTO operations.

* * * * *